(No Model.)
W. B. SWARTWOUT.
LUMBER TRIMMING MACHINE.
No. 250,174. Patented Nov. 29, 1881.
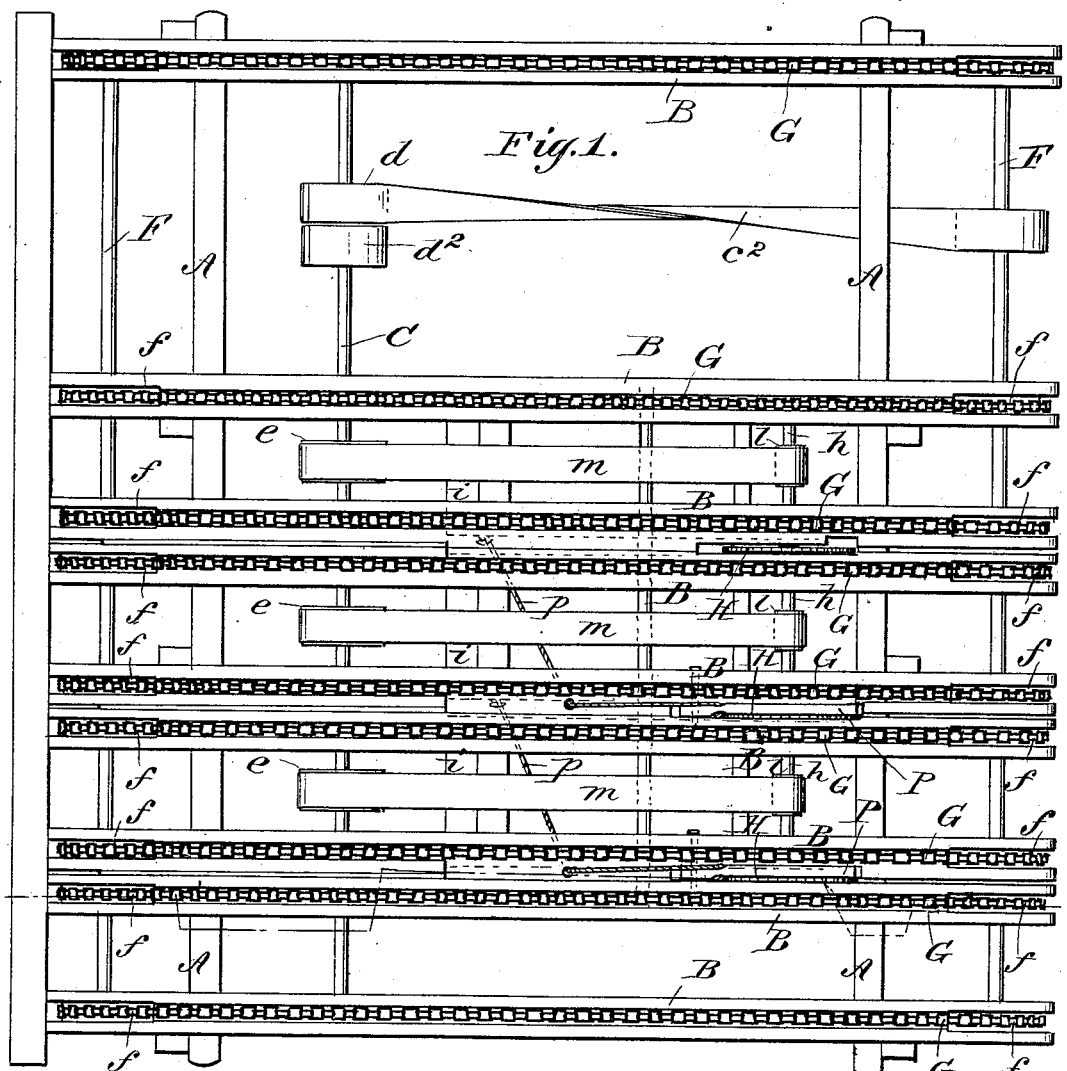
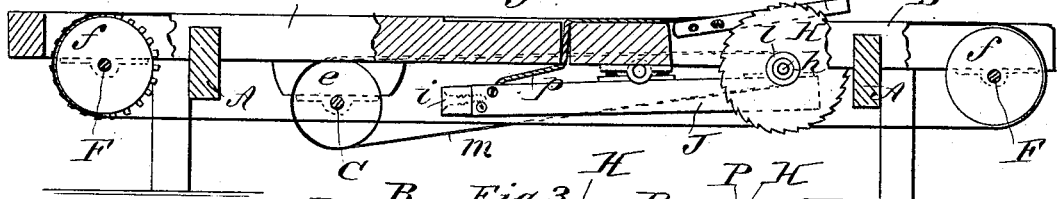
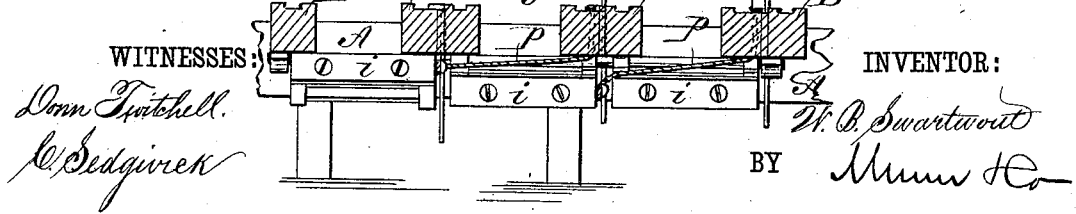
WITNESSES:
Donn Twitchell.
C. Sedgwick.
INVENTOR:
W. B. Swartwout
BY
Munn & Co
ATTORNEYS.

UNITED STATES PATENT OFFICE.

WILLARD B. SWARTWOUT, OF THREE RIVERS, MICHIGAN.

LUMBER-TRIMMING MACHINE.

SPECIFICATION forming part of Letters Patent No. 250,174, dated November 29, 1881.

Application filed May 4, 1881. (No model.)

*To all whom it may concern:*

Be it known that I, WILLARD B. SWARTWOUT, of Three Rivers, in the county of St. Joseph and State of Michigan, have invented a new Improvement in Lumber-Sawing Machines, of which the following is a full, clear, and exact description.

My invention relates to a machine for sawing lumber or boards into certain standard lengths known in the trade as, for example, "twelve-foot" lengths, "fourteen-foot" lengths, or lengths denominated by the number of feet.

The invention consists in a novel construction, arrangement, and combination of certain devices, whereby provision is made for automatically feeding the lumber to the saws and adjusting said saws so as to cause them to cut the lumber in the desired lengths, as hereinafter more particularly described.

In the accompanying drawings, Figure 1 is a top view of a machine embodying my improvements. Fig. 2 is a longitudinal vertical sectional view of the same. Fig. 3 is a transverse vertical sectional view.

The working parts of the apparatus are carried by a frame-work of any suitable description, but preferably composed of transverse beams A and longitudinal rails B, resting thereon. The two outermost of the longitudinal rails B are provided with hangers, in which is journaled a horizontal shaft, C, constituting the main driving-shaft, to which is attached a fast pulley, $d$, and loose pulley $d^2$, and a series of pulleys, $e\ e\ e$, for the purposes hereinafter described.

At the front and rear ends of the frame-work, journaled in hangers in the longitudinal rails, are horizontal shafts F, carrying spur or sprocket wheels $f$, around which pass endless chains G for feeding the lumber to the saws, said chains being arranged to travel in grooves in the rails B. One of the shafts F is provided with a pulley, by which it receives motion through a band, $c^2$, from the shaft C.

The saws H are carried by arbors $h$, each of which is journaled at one end of a frame, J, at the other end of which is a counterbalance-weight, $i$. Each frame J is pivoted in hangers on the under sides of the rails B, so that when the frames are at rest the saws protrude above the level of the tops of the rails B and the chains G. The arbors $h$ are provided with pulleys $l$, which receive motion through bands $m$ from the pulleys $e$ on the shaft C, before referred to.

There may be any suitable number of saws and saw-carrying frames, according to the number of lengths for which it is desired to provide. As here shown, there are three, which, by way of illustration, will be designated as intended to cut lengths of twelve, fourteen, and sixteen feet, respectively.

Looking downward from the top of Fig. 1, the first saw represents the one for cutting twelve-foot lengths, the second for fourteen-foot lengths, and the third for sixteen-foot lengths. To the frame of the first saw is attached one end of a cord or chain, $p$, which passes through a hole in one of the rails B, and has its other end attached to a lever, P, pivoted in a slot in the rail B, in which the second saw works. To the frame of the second saw is attached a similar cord or chain connected to a similar lever; and this arrangement may be continued further, according to the number of saws employed.

The pieces of lumber or boards to be sawed into standard lengths, as above referred to, are placed on the chains G, above the rails B, at the part of the machine represented by the upper portion of Fig. 1 of the drawings, and are carried by the chains to the rear end of the machine. On reaching the line of the saws, if a piece of lumber or a board is more than twelve and less than fourteen feet long, it is sawed by the first saw into a twelve-foot length. If more than fourteen and less than sixteen feet long, the board or piece of lumber, before reaching the second saw, strikes and depresses the lever P, causing it to pull the cord or chain $p$, so as to raise the weighted end of the frame J and depress the other end and carry the first saw below the level of the rails, and the board is then cut by the second saw, but not touched by the first one. If more than sixteen and less than eighteen feet long, the lumber depresses the first and second levers, so that it is cut by the third saw and not touched by the first and second.

Having thus described my invention, what I claim as new, and desire to secure by Letters Patent, is—

In a machine for sawing lumber into different lengths, the means for automatically depressing intermediate saws below the bed or table of the machine, consisting of the cord $p$, rigidly attached to a swinging saw-frame at or near its weighted end, and passing through suitable guideways, in combination with a pivoted lever, P, adjacent to the next succeeding saw-frame, whereby the intermediate saws will be depressed, as set forth.

WILLARD B. SWARTWOUT.

Witnesses:
J. P. McKEY,
C. L. BLOOD.